UNITED STATES PATENT OFFICE.

ROBERT GRAHAM, OF CUPAR, SCOTLAND.

PROCESS OF PRODUCING BREAD AND OTHER LIKE FOODSTUFFS.

1,387,387. Specification of Letters Patent. Patented Aug. 9, 1921.

No Drawing. Application filed April 23, 1919. Serial No. 292,225.

*To all whom it may concern:*

Be it known that I, ROBERT GRAHAM, a subject of the King of Great Britain and Ireland, residing at "Haymount", Cupar, in the county of Fife, Scotland, have invented new and useful Improvements in Processes of Producing Bread and other like Foodstuffs, of which the following is a specification.

This invention relates to bread and like food stuffs and processes of producing same, and comprises generally improved methods of the transformation or conversion of cereals and edible tubers into an assimilable and digestible food and specifically an improved bread in which is incorporated or blended in suitable proportions flour made from wheat or other cereals, either with or without any suitable proportion of the bran and middlings, and flour made from edible tubers or other starch producing materials other than cereals, the object being specially to utilize in food-stuffs edible tubers and the like which are more easily and cheaply grown than cereals, and generally to produce bread and other food stuffs which contain the constituents of the cereals, and tubers in a form in which they can be readily utilized by the human system, which contain those vital principles known at present under the generic term of "vitamins" in an active condition, and which have great digestibility and solubility, fine flavor and palatableness, and the property of keeping fresh and in a wholesome condition for a considerable period of time.

In the methods at present employed of substituting or diluting wheat flour with starch containing materials, i. e. by milling the wheat and other material together or by milling separately and mixing the milled flours or in the case of potatoes, by cooking and adding the cooked potatoes to the sponge in the first instance, the percentage of gluten in the resulting mixture is considerably reduced, consequently a greater strain is placed on its elasticity and raising power with the result that the texture of the bread is closer, the loaf is not capable of holding such a large quantity of the gas produced by the fermentation and consequently the interstices are fewer and the dividing walls of the interstices thicker. There is thus less surface presented to the action of the digestive juices of the human system and the bread takes longer time to digest or a greater proportion remains undigested, further the proportion of soluble proteid and albumenoid bodies which act as a stimulant to the yeast during the process of setting the sponge is reduced with the result that the dough is heavy and close. In consequence of these shortcomings, considerable modifications in the temperature are necessary resulting in an unsatisfactorily baked and indigestible loaf.

By the present invention the difficulties formerly experienced in the utilization in bread of starch containing materials other than wheat are effectively overcome in a thoroughly practical manner and a bread or food product containing a high percentage of starch containing material other than wheat is obtained which is readily digestible and assimilable, which is more wholesome, which has a far higher nutritive value, and which will keep fresh and palatable for a very much longer period of time.

The present invention comprises essentially a special preparation and treatment of the edible tubers used as the additional starch containing material for the purpose of gelatinizing and converting the starch therein by the addition of barley malt or other malted cereal or by means of an extract of malt or other material containing diastase or starch liquefying and converting enzym. It also comprises the utilization of said treated starch containing material with the higher and lower grades of wheat flour to form ferments or sponges which after a special treatment are mixed together to form a dough which in the case of bread or the like is baked at a comparatively low baking temperature to conserve enzymic action.

In carrying this invention into practice the additional starch containing material is first heated with the addition of a suitable quantity of water in order to gelatinize the starch, which is then rendered soluble and wholly or partially converted into sugars by digesting at a suitable temperature with a proportion of malted wheat, barley or the like. By this treatment little or no extra strain is placed on the gluten and it is able to exert its normal raising power. Further by this treatment the enzyms of the malted material produce food material for the yeast from the albumenoid bodies in the flour which stimulates its activity with consequent greater production of gas in the loaf. These tend to produce a large light loaf which is of good texture and in which the number of interstices are larger and the walls thinner. Further the better quality of the dough enables the baking to be carried out in a more practical and efficient manner. The result is the production of a large light loaf which contains a high percentage of soluble matter, which is very digestible, sweet, palatable and wholesome, and which will keep fresh and fit for human consumption for a considerable period of time.

In applying the present invention for example to the production of a bread from wheat flour and edible tubers the procedure is as follows:—When the additional starch containing material is prepared from dried edible tubers these are first ground to a fine flour with or without any separation of the outer skin or husk. To any given quantity of the flour thus produced is added finely ground malted cereal—in the proportion of 1 lb. of malted cereal to every 15 lbs. of flour—and from 2½ to 3 times the quantity—according to the tubers used—of water which has been heated to from 120° to 135° Fahr. After thorough mixing the temperature of the mash is slowly raised to about 145° Fahr. and then quickly raised to about 212° Fahr. The mash is kept at this temperature until complete gelatinization and conversion of the starch has been effected which will occupy from 30 mins. to 1 hour, and is afterward reduced to a temperature of about 160° Fahr.

If the edible roots are used in their natural state they are after being thoroughly washed, reduced by any suitable means to a pulp. The temperature of the pulp is then raised to about 212° Fahr., and is kept at this temperature until complete gelatinization of the starch has been effected which will occupy from 30 mins. to 1 hour. The temperature of the pulp is then reduced to about 160° Fahr. and to it is added a percentage of finely ground malted cereal, say 1 lb. to each 56 lbs. of pulp. After thorough mixing the temperature is again raised to about 212° Fahr. and is kept at same for about 30 mins. and is afterward reduced to a temperature of about 160° Fahr.

The malted starch containing material produced by either of the before described processes is divided into two parts the one containing 39 per cent. of the whole and the other 61 per cent. for the purpose of making two ferments or sponges.

To the 61 per cent. of the malted starch containing material is added an approximately equal quantity of first grade or fine white flour and a small quantity of yeast. Expressed in parts by weight a suitable formula for this mixture is:—

Malted starch containing material__ 70 lbs.
First grade or fine white flour____ 67 lbs.
Yeast _____ 2¼ lbs.

This mass is set at a temperature of about 75° Fahr. and allowed to work or ferment for about 4½ hours, being worked up several times during this period to encourage activity of the yeast. This product I call ferment No. 1.

To the 39 per cent. of the malted starch containing material is added a further quantity of a finely ground malted cereal. Suitable proportions for this are:—

Malted starch containing material__ 42 lbs.
Malted cereal _____ 7 lbs.

This mixture is kept at a temperature of 160° Fahr. for 20-40 minutes. At the end of this time second grade or household flour and yeast is added. Expressed in parts by weight a suitable formula for this is:—

Malted starch containing material__ 49 lbs.
Second grade or household flour___ 25 lbs.
Yeast _____ 1 lb.

After being thoroughly mixed the mass is set at a temperature of about 80° Fahr. to work for about 1½ hours. This product I call ferment No. 2.

When the two ferments or sponges are ready, they are worked up with the requisite quantity of salt to form a dough. This dough is set at a temperature of from 75° to 82° Fahr. for ½ to 1 hour, and when ripe is cut up in pieces, scaled or weighed out panned. The dough is allowed to fill or prove in the pans for from ½ to 2 hours at an even temperature of 80° Fahr. or thereabout, and it is then put in the oven at a temperature of from 320° to 350° Fahr. The temperature of the oven is allowed to drop after a sufficient time has elapsed for the heat to penetrate the loaf until a final temperature of from 290° to 270° Fahr. is reached, when it is maintained at this temperature until the loaves are baked, the whole period of baking being from 3½ to 4 hours.

When a whole meal or entire wheat bread is required the additional malted starch containing material is produced in the manner before described after which the process is as follows:—

To the 39 per cent. of the malted starch containing material is added an approximately equal quantity of first grade or fine white flour and a small quantity of yeast. Expressed in parts by weight a suitable formula for this mixture is:—

| | |
|---|---|
| Malted starch containing material | 44 lbs. |
| First grade or fine white flour | 48 lbs. |
| Yeast | 1½ lbs. |

This mass is set at a temperature of about 75° Fahr. and allowed to work for about 4½ hours being worked up several times during this period to encourage activity of the yeast. This product I call ferment No. 1.

To the 61 per cent. of the malted starch containing material are added a further quantity of finely ground malted cereal and bran and middlings.

Expressed in parts by weights a suitable formula for this mixture is:—

| | |
|---|---|
| Malted starch containing material | 58 lbs. |
| Middlings | 5 " |
| Bran | 10 " |
| Malted cereal | 12 " |
| Yeast | 2 " |
| Second grade or household flour | 18 " |

In the first place 6 lbs. of the additional malted cereal is added to the malted starch containing material and the mixture is kept at a temperature of 160° Fahr. for about 20 minutes. At the end of that time the remainder of the additional malted cereal and the middlings and bran are added. The resultant mash is then kept at a temperature of from 120° to 140° Fahr. for 4 hours or thereabout, and at the end of this time the second grade or household flour and the yeast are added and after being thoroughly mixed the mass is set at a temperature of about 80° Fahr. to work for about 1½ hours. This product I call ferment No. 2.

When the two ferments or sponges are ready they are worked up, treated and baked as before described.

Although I prefer to use edible tubers for the production of the additional starch containing material I wish it to be understood that this does not exclude the use of other materials such as rice, peas, beans, lentils, etc., as although some of these do not contain as much starch they are richer in proteids.

The edible tubers I prefer to use for the additional starch containing material are potatoes but other such tubers as carrots, parsnips, beet and artichockes may also be usefully employed.

I claim:

1. A bread or other food stuff composed essentially of a cereal flour and a predominating quantity of additional starch containing material other than a cereal, gelatinized and converted by treatment with a diastatic and solubilizing agent.

2. A process for preparing bread composed essentially of a cereal flour and a predominating quantity of additional starch containing material other than a cereal, gelatinized and converted by a diastatic and solubilizing agent, comprising first heating the starch material with water to gelatinize it and subsequently treating it with a malted cereal, dividing the mass into two unequal parts, the greater one of which is mixed with a similar quantity of a high grade flour and yeast and the smaller part has added to it a further quantity of malted cereal together with a larger quantity of lower grade flour and yeast, mixing the two sponges so produced, and baking.

3. In a process for preparing bread composed essentially of a cereal flour and a predominating quantity of additional starch containing material other than a cereal, gelatinized and converted by a diastatic and solubilizing agent, gelatinizing and converting the starch containing material by treatment with a starch liquefying and converting enzym, employing such treated material as an agent for treatment of the bran and middlings of the milled cereal, forming a sponge of the converted starch material with a high grade flour forming another sponge of the converted starch material with a low grade flour, the bran and middlings of the milled cereal and a further quantity of a diastatic agent, mixing said sponges to form a dough and baking same.

4. In a process for preparing bread composed essentially of a cereal flour and a predominating quantity of additional starch containing material other than a cereal, gelatinized and converted by a diastatic and solubilizing agent, milling and separating the products of the berry of the cereal into several grades, each of which is distinguishable by the extent to which it is convertible into a readily assimilable food, treating the portions containing the higher proportion of difficultly convertible material with a malted cereal in conjunction with starch containing edible tubers and forming therewith a sponge, separately treating the other grades of the milled cereal with malted cereal and forming another sponge, mixing the two sponges together to form a dough and baking same at a low baking temperature.

ROBERT GRAHAM.